United States Patent [19]
Sattler et al.

[11] Patent Number: 5,459,645
[45] Date of Patent: Oct. 17, 1995

[54] WIDE ANGLE LIGHT COUPLER FOR IMAGE ILLUMINATION

[75] Inventors: Walter J. Sattler, Flint; Neale R. Clark, New Baltimore; Leroy E. Medendorp, Washington, all of Mich.

[73] Assignee: Delco Electronics Corporation, Kokomo, Ind.

[21] Appl. No.: 179,173

[22] Filed: Jan. 10, 1994

[51] Int. Cl.⁶ ..................................................... G01D 11/28
[52] U.S. Cl. .................. 362/30; 362/32; 362/297; 362/307; 362/346; 359/49
[58] Field of Search .................. 359/48, 49; 362/29, 362/30, 355, 356, 32, 297, 307, 346; 40/547, 563, 564, 577

[56] References Cited

U.S. PATENT DOCUMENTS

| | | | |
|---|---|---|---|
| 1,595,173 | 8/1926 | Stiert | 362/355 |
| 3,419,986 | 1/1969 | Maze | 40/564 |
| 3,711,701 | 1/1973 | Squyres | 362/355 |
| 4,274,131 | 6/1981 | Praamsma | 362/356 |
| 4,765,718 | 8/1988 | Henkes | 359/49 |
| 4,915,479 | 4/1990 | Clarke | 359/49 |
| 4,950,059 | 8/1990 | Roberts | 359/48 |
| 5,134,548 | 7/1992 | Turner | 359/48 |

FOREIGN PATENT DOCUMENTS 5-142533  6/1993  Japan ..................... 359/48

*Primary Examiner*—Ira S. Lazarus
*Assistant Examiner*—Alan B. Cariaso
*Attorney, Agent, or Firm*—Jimmy L. Funke

[57] ABSTRACT

Back lighting for an transmissive display panel such as a transparency or a liquid crystal display for direct viewing or image projection is afforded by a light source spaced from the display panel and an intervening light coupler comprising a tapered duct with reflective inner walls such as a frustoconical mirror. The small end of the duct is adjacent the light source and may include a diffuser film to enhance light uniformity at the display. Light reflection from the reflective walls provides off-axis viewability with substantially uniform brightness. The light coupler is useful in a vehicular head up display.

11 Claims, 1 Drawing Sheet

WIDE ANGLE LIGHT COUPLER FOR IMAGE ILLUMINATION

FIELD OF THE INVENTION

This invention relates to back lighting of an image and particularly to an arrangement for coupling light to an image for off-axis viewing.

BACKGROUND OF THE INVENTION

In head up displays such as those used in automotive vehicles for presenting instrument information in the line of sight of the vehicle operator it is necessary to provide an image bright enough for legibility during bright day time conditions. It is known to use a light emissive image source such as a vacuum fluorescent tube. Such tubes produce a blue-green image with limited brightness and resolution. It is desirable, however, to have full color displays with a bright image and high resolution. It is further required for such displays that bright uniform illumination be apparent for off-axis viewing of the display to accommodate movement of the observer's head. For head up displays a viewing angle 15 degrees from the center axis of the LCD without noticeable edge darkening is generally sufficient.

Liquid crystal displays (LCD) afford full color images of the desired resolution but require bright back lighting for projecting an acceptable image onto the windshield or other viewing surface. Intense light sources generally are based on incandescence or plasma discharge and create sufficient heat to result in unacceptably high temperatures of the LCD; according it has been proposed to isolate the lamps from the LCD by fiber optic coupling or lens arrangements. Each of these light coupling approaches introduces light loss elements between the source and LCD requiring even brighter lamps. In addition such elements may impose restrictions on the image uniformity for off-axis projection.

SUMMARY OF THE INVENTION

It is therefore an object of the invention to couple light to the rear of a flat display panel while adding no in-line attenuation and providing uniform off-axis illumination without noticeable edge darkening. Another object in such light coupling is to illuminate a display panel much larger in area than the light source.

The wide angle illumination coupler described here is useful for both projection type displays, as in head up displays, and direct viewing displays such as an illuminated transparency or screen (of any size) with no optical elements such as lenses intervening between the display panel and the observer. Laterally disposed mirror surfaces, however, are used to efficiently direct light from the light source to the image.

A head up display is generally mounted behind a vehicle instrument panel below the windshield and comprises an illuminated image source and a system of mirrors for projecting the image onto the windshield. Here the image source is a flat panel display such as a transmissive LCD and a light source illuminates the LCD sufficiently for bright image projection. The LCD may be either monochrome or full color, the full color type requiring a much brighter illumination because it absorbs five times as much light as the monochrome type. The light source is a lamp spaced from the LCD for thermal protection of the LCD. A wide angle light coupler between the lamp and the LCD makes possible uniform illumination of the LCD, even for off-axis projection, and allows use off a light source much smaller than the LCD panel. Efficiencies in coupling light to the display results in a greater light intensity compared to that afforded by conventional light sources using the same lamp.

The wide angle light coupler comprises a tapered duct with reflecting internal surfaces such as a frustoconical mirror. The duct defines a small opening at one end and a large opening at the other end. A light source or lamp at the small end of the duct illuminates the duct internally. The display panel is at the large opening for direct illumination by the lamp as well as for illumination by light reflected from the internal surfaces of the duct. While the far off-axis illumination depends heavily on reflected light, both the direct and reflective light contribute to on-axis and off-axis illumination. In the case of on-axis viewing the illumination is substantially uniform even though the area of the lamp may be one fourth the area of the display panel, for example. A diffuser film covering one end or each end of the duct promotes light uniformity for those applications requiring it, particularly for off-axis viewing.

The cross-sectional shape of the duct is not critical; instead of the circular section of the frustoconical mirror, the duct may be rectangular, for example, or circular at the small end and rectangular at the large, image end. The taper angle, on the other hand is important to correct image illumination. The effect of the tapered walls is to promote viewability at off-axis positions due to reflections from the mirrored wall toward the desired viewpoint. On the other hand, as the number of reflections increases, light loss also increases, resulting in lower brightness. The optimal condition for off-axis viewing is one or two reflections from the tapered walls. The particular angle at which that occurs depends on the viewing angle, the size of the light source and the permissible length of the duct.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

While the ensuing description is directed toward the illumination of an LCD panel for a head up display, the principle of the invention has broader application. It is useful in any display requiring back lighting for either direct viewing or projection, and is particularly desirable for those applications where uniformity of illumination and/or off-axis viewing are important.

Figure 1:
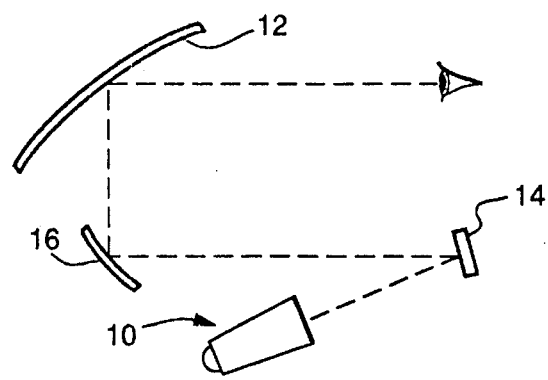
FIG. 1 is a schematic diagram of a head up display incorporating an image source according the invention.

Referring to FIG. 1, a head up display comprises an image source 10 for projecting an image via a mirror arrangement and a vehicle windshield 12 or other combiner to the eye of an observer. The mirror arrangement includes a folding mirror 14 for packaging convenience and an aspheric mirror 16 which is shaped to compensate for distortions which would otherwise be introduced by the curvature of the windshield 12. The aspheric mirror 16 also focuses the light to achieve a desired image size and apparent position of the image relative to the windshield.

Figure 2:
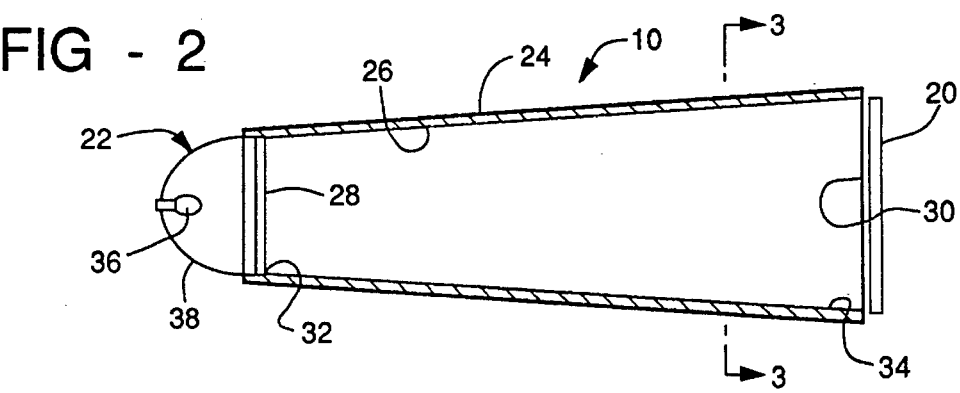
FIG. 2 is a cross section of the image source of FIG. 1.

The image source 10, best seen in FIG. 2, comprises a flat display panel 20, a light source 22 spaced from the panel 20, and a wide angle light coupler 24 between the panel 20 and the light source 22. The light coupler 24 is an opaque tapered duct having a reflective inner surface 26. The inner surface is sufficiently smooth for specular reflection but a high degree of polish is not necessary. The tapered duct has a small end 32 having an opening optionally covered by a light diffusing film 28 and which abuts the light source 22, and a large end 34 having an opening optionally covered by a diffusing film 30 and abutting the flat display panel 20. The small end 32 and its opening are preferably much smaller then the large end 34 and its opening, say, one fourth as large in area. The light source 22 comprises a lamp 36 and a reflector 38 for brightly illuminating the interior of the tapered duct 24. The flat display panel preferably is a transmissive full color active matrix liquid crystal display.

Figure 3A:
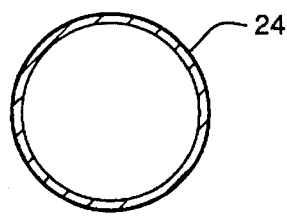
FIGS. 3a and 3b are cross sections taken along line 3—3 of FIG. 2 for first and second embodiments of the image source according to the invention.
Figure 3B:
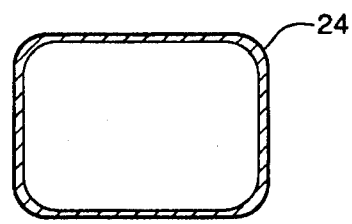

The tapered duct 24 may be a frustoconical mirror which, as shown in FIG. 3a has a circular cross section. However, the display panel 20 is usually rectangular, so a possible duct shape is one having a circular cross section at the small end, assuming the light source is circular, and a rectangular cross section at the large end, as indicated in FIG. 3b. Where a rectangular light source is used, the small end may also be rectangular. In any event the side walls are tapered outward toward the display panel. The amount of taper or the angle of the reflective surface to the center axis of the light coupler is determined by the sizes of the light source and the display panel, the desired off-axis viewing angle, and the space available to accommodate the length of the duct. A small taper angle is desirable since it minimizes the number of reflections from the tapered surfaces for off-axis viewing, and thus minimizes loss of light. Some taper is required to effect at least one reflection for off-axis viewing. It is preferred that one or two reflections be permitted as determined from a ray diagram. More than two reflections reduce display brightness an unacceptable amount.

In practice, a frustoconical mirror having a 0.5 inch diameter at one end, 1 inch diameter at the other end and a 2 inch length (yielding a 7 degree angle) gave good results in a head up display requiring a 15 degree off-axis projection and having a full color LCD. On the other hand, a frustoconical mirror having a 0.44 inch diameter and 1 inch diameter ends and 1.6 inch length gave much less satisfactory results under similar circumstances. In each case a diffuser 28 comprising a 0.005 inch thick film of diffusing plastic at the small end was used to enhance the brightness uniformity. The display brightness varied by 80% across the display without the diffuser 28 due to hot spots, such as the filament, in the light source. The diffuser reduced the brightness substantially but the display brightness varied by only 20%, which is hardly noticeable to the eye.

Figure 4:
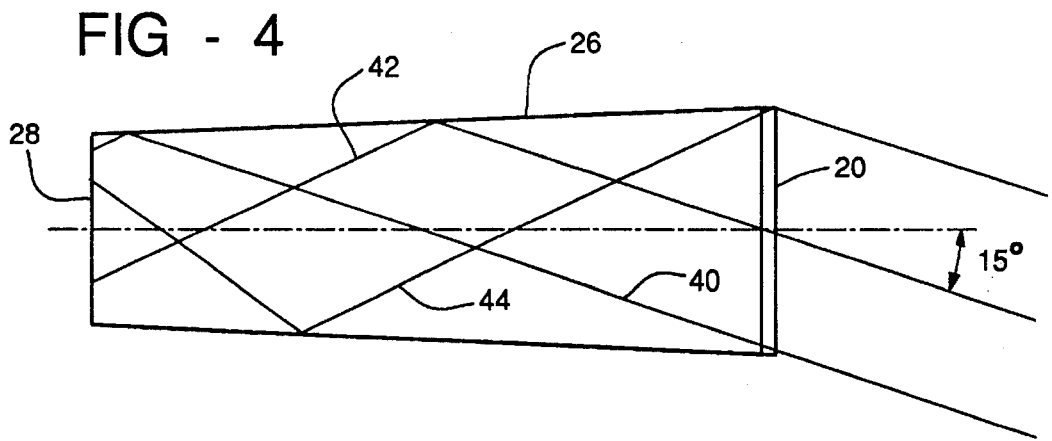
FIG. 4 is a light ray diagram for the image source of FIG. 1.

FIG. 4 illustrates a ray diagram of a frustoconical mirror for the case of a 15 degree off-axis projection. The rays 40 and 42 from the diffuser reflect once and the ray 44 reflects twice from the mirror surface 26 to reach the display panel 20 and then continue in the off-axis direction. Although not shown here, it can readily be recognized that rays projected axially from the light coupler will comprise a center group directly from the light source and a surrounding group which reflects just once from the reflective surface. In practice, when the display is viewed from various directions, reflections from the mirror cause the source to always appear to move to a position directly behind the panel in line with the viewing direction.

It will thus be seen that the wide angle light coupler is useful in lighting directly viewed displays and in projection displays such as head up displays; it separates the light source from the display panel for thermal protection and provides substantially uniform illumination for both on-axis and off-axis viewing. Depending on the nature of the light source and the desired image quality, it is feasible for some applications to dispense with diffusers or other light reducing elements in the space between the light source and the display panel. In other cases it is desirable to enhance the uniformity of image brightness by incorporating a diffuser at the small end of the tapered duct or at both ends. Display intensity as well as uniformity is enhanced. Photometer measurements of displays using conventional illumination and those using the reflective tapered duct reveal a light intensity increase of three or four times over the conventional, even though both use the same wattage bulb.

We claim:

1. An image illumination apparatus for back lighting an display panel comprising:

a light source spaced from the display panel and having an area smaller than the panel;

an elongate tapered duct having a specular reflecting inner surface for coupling light from the light source to the display panel, the duct having a first opening at one end adjacent the light source and a second opening at the opposite end adjacent the panel, the second opening being larger than the first, and a first light diffusing element over the first opening and a second light diffusing element over the second opening of the elongated tapered duct for enhancing illumination uniformity, whereby the display panel is illuminated for direct and off-axis viewing.

2. The invention as defined in claim 1 wherein the reflecting inner surface has an angle relative to the longitudinal axis of the duct sufficient to achieve a substantially uniform illumination for an off-axis view of the image panel with a maximum of two reflections of any light ray from the reflecting surface.

3. The invention as defined in claim 1 wherein the duct is frustoconical.

4. The invention as defined in claim 1 wherein the second opening is substantially rectangular and the tapered duct is shaped to conform to the second opening.

5. The invention as defined in claim 1 wherein the duct is frustoconical and has a cone angle on the order of 7 degrees from its longitudinal axis.

6. The invention as defined in claim 1 wherein the area of the second opening is on the order of four times the area of the first opening.

7. In a head up display for a vehicle wherein an image generated by a transmissive liquid crystal display (LCD) is projected via a plurality of reflective elements to the field of view of a vehicle operator, a back lighting arrangement comprising:

a light source smaller than the LCD and spaced therefrom;

an elongate tapered duct with a reflective internal surface between the light source and the LCD, the duct having a first opening at one end coupled to the light source and a second opening at the opposite end coupled to the LCD, and a first light diffusing element over the first opening and a second light diffusing element over the second opening of the elongated tapered duct for enhancing illumination uniformity, whereby light from the source substantially uniformly illuminates the LCD by direct passage through the duct and by reflection from the internal surface for on-axis and off-axis projection.

8. The invention as defined in claim 7 wherein the tapered duct comprises a frustoconical mirror.

9. The invention as defined in claim 8 wherein the conical mirror has an angle relative to the longitudinal axis of the order of 7 degrees.

10. The invention as defined in claim 7 wherein the internal surface is tapered sufficiently to establish substantially uniform illumination of the LCD for viewing up to 15 degrees off-axis.

11. The invention as defined in claim 7 wherein light rays experience a maximum of two reflections between the light source and the LCD.

\* \* \* \* \*